United States Patent
Oberg et al.

(10) Patent No.: US 7,567,491 B1
(45) Date of Patent: Jul. 28, 2009

(54) SLICER BIAS LOOP

(75) Inventors: Mats Oberg, Cupertino, CA (US);
Christopher Painter, Lafayette, CO (US)

(73) Assignee: Marvell International Ltd., Hamilton (BM)

( * ) Notice: Subject to any disclaimer, the term of this patent is extended or adjusted under 35 U.S.C. 154(b) by 733 days.

(21) Appl. No.: 11/327,684

(22) Filed: Jan. 6, 2006

Related U.S. Application Data

(60) Provisional application No. 60/702,164, filed on Jul. 25, 2005.

(51) Int. Cl.
*G11B 7/00* (2006.01)
(52) U.S. Cl. ................. 369/59.21; 369/59.22
(58) Field of Classification Search .............. None
See application file for complete search history.

(56) References Cited

U.S. PATENT DOCUMENTS

| | | | | |
|---|---|---|---|---|
| 6,324,144 B1 * | 11/2001 | Won et al. | ............... | 369/59.15 |
| 6,396,787 B1 * | 5/2002 | Lee et al. | ............... | 369/59.18 |
| 6,876,616 B2 * | 4/2005 | Tonami | ............... | 369/59.17 |
| 7,198,197 B2 * | 4/2007 | Best | ............... | 235/492 |
| 2003/0066023 A1 * | 4/2003 | Lee et al. | ............... | 714/799 |

* cited by examiner

*Primary Examiner*—Wayne R Young
*Assistant Examiner*—Lixi Chow

(57) ABSTRACT

A bias loop is provided for automatic threshold level adjustment in data detectors, such as a slicer detectors or threshold detectors. The bias loop monitors characteristics of the data detector's output, such as its digital sum value, to generate a signal correction term, which is used to adjust the detector's input. Alternatively, the bias loop may adjust the data detector's actual threshold value.

45 Claims, 14 Drawing Sheets

SLICER BIAS LOOP

CROSS REFERENCE TO RELATED APPLICATION

This application is a non-provisional patent application claiming the benefit of U.S. Provisional Patent Application No. 60/702,164, filed Jul. 25, 2005, which is hereby incorporated by reference herein in its entirety.

BACKGROUND OF THE INVENTION

This invention relates generally to data detectors and, more particularly, to automatic threshold level adjustment in data detectors.

Data detectors, such as threshold detectors (also known as slicers or transition detectors), are used in a wide variety of digital applications. These applications include data storage, retrieval, and transmission systems. Some of these systems use optical discs in lieu of traditional magnetic storage. Optical discs have many advantages over their magnetic counterparts, including easier portability and the ability to deliver multimedia content, games, and other data at a low cost.

Data is stored on an optical disc in the form of microscopic pits (or marks) and lands (or spaces), which separate neighboring pits. As the optical disc spins, the pits and lands pass over an optical laser beam. The pits and lands of the disc reflect the laser beam at varying intensities. The reflected beam is then detected by an optical pick-up unit and converted to a stream of binary data. Whenever the pick-up laser passes over a pit, a binary "0" is read. Whenever the pick-up laser passes over a land, a binary "1", is read. The resulting system of encoded channel data is then converted to user data by a series of decoding steps.

Optical data systems, like other data storage and retrieval systems, are not immune to noise and channel distortion. As recording densities continue to increase relative to the wavelength of the light and other factors, the spectrum of the readback signal becomes band-limited relative to the channel data rate. As a result, the pick-up signal suffers from resolution loss. Other potential problems with optical channels are DC-offsets and signal asymmetry.

Signal asymmetry in optical channels results, in part, from irregular or incorrect pit or land sizes. For example, the lengths of the pits of an optical disc might be longer than their nominal length. This results in lands being correspondingly shorter than their nominal length. If not equalized or otherwise handled appropriately, signal asymmetry can result in increased detector decision errors, causing high data transfer error rates.

Because, in part, of the above channel distortions, traditional data slicers and threshold detectors use less than optimal threshold values. The threshold value in a data slicer or threshold detector determines when the optical pick-up signal is considered high or low. If the signal is below the detector's threshold, the signal may be estimated as a low signal. Similarly, if the optical pick-up signal is above or equal to the detector's threshold, this signal may be estimated as a high signal. Channel asymmetry can shift the optimal threshold value of the data detector.

A variety of techniques are used to find the optimal threshold of data slicers or threshold detectors. One technique is to adjust the detector's threshold based on the average of the positive and negative peaks of the data pick-up signal. Although this technique is simple to implement, it is not very effective for signal asymmetry since the peaks of the optical pick-up signal are typically unaffected by signal asymmetry.

Another technique used to find a data detector's optimal threshold is to incorporate non-linear equalization into the detector to help reduce channel distortion and noise. For example, decision feedback equalizers may be used to compute an error signal based on the detector decisions convolved with some model of the data channel. The detector's input is then adjusted based on the average of this error signal. Although this approach provides increased resolution, equalization techniques alone are still suboptimal because equalization does not reduce decision errors near transitions.

A final technique for adjusting the threshold value of a threshold detector involves sampling the optical pick-up signal during transitions. Using this technique, if the expected optical pick-up signal at a transition is zero, then the mean of the samples at the transition can be used as the detector's threshold value. Alternatively, a loop filter can be used to drive the average value of the pick-up signal transitions to zero. This technique works well for signal asymmetry because the mean of the transition samples is the most accurate and reliable threshold value.

Using a loop filter to drive the average value of the pick-up signal transitions to zero presents a problem. If the pick-up signal contains a large DC-offset, the loop filter may drive the average value of the pick-up signal transitions to one or more incorrect points. These incorrect transition points are called false locking points. If the detector locks to a one of these false locking points, the threshold detector will make many data decision errors, resulting in a high data transfer error rate.

Accordingly, it is desirable to provide a slicer bias loop that monitors characteristics of a detected signal in addition to the value at signal transitions in order to eliminate or reduce false locking points. The bias loop may be integrated with any data slicer or threshold detector to reduce decision errors and improve the detector's performance.

SUMMARY OF THE INVENTION

These and other objects of the invention are accomplished in accordance with principles of the present invention by providing a slicer bias loop that monitors the digital sum value ("DSV") of a threshold detector's output and the transition value of a threshold detector's input.

A threshold detector input pick-up signal is coupled to transition monitoring circuitry. The transition monitoring circuitry is configured to sample the threshold detector's input during signal transitions and output a DC correction signal. The output of the threshold detector is also coupled to DSV monitoring circuitry. The DSV monitoring circuitry is adapted to output another DC correction signal when the DSV monitoring circuitry determines that the DSV of the threshold detector's output exceeds a threshold value. The DC correction signals from the transition monitoring circuitry and the DSV monitoring circuitry are output to loop filter circuitry. The loop filter circuitry is adapted to output a correction term, which is used to adjust the input of the threshold detector via signal adjustment circuitry.

In some embodiments, the DSV monitoring circuitry calculates the DSV of the threshold detector's output using a downsampled clock source.

The invention also includes methods for operating circuitry of the types summarized above.

Further features of the invention, its nature and various advantages, will become more apparent from the accompanying drawings and the following detailed description.

DETAILED DESCRIPTION OF THE PREFERRED EMBODIMENTS

Embodiments of the present invention relate to bias loops for automatic threshold level or input signal adjustment in data detectors. The bias loops of the present invention may be used with any data detector, including threshold detectors (also known as data slicers). These detectors may be an integral part of a wide variety of communication systems, including optical (e.g., CD, DVD, HD-DVD, and/or Blu-Ray) and magnetic data systems. The bias loop of the invention may be used with bilevel or multilevel data detectors. These detectors may be the main data detectors of the communication system. Additionally or alternatively, the data detectors may be used to drive loops and signal enhancement blocks (e.g., adaptive loops, such as timing loops, gain loops, offset loops, baseline loops, and/or asymmetry correction loops), while another data detector (e.g., a Viterbi detector) is used as the main data detector of the system.

Figure 1:
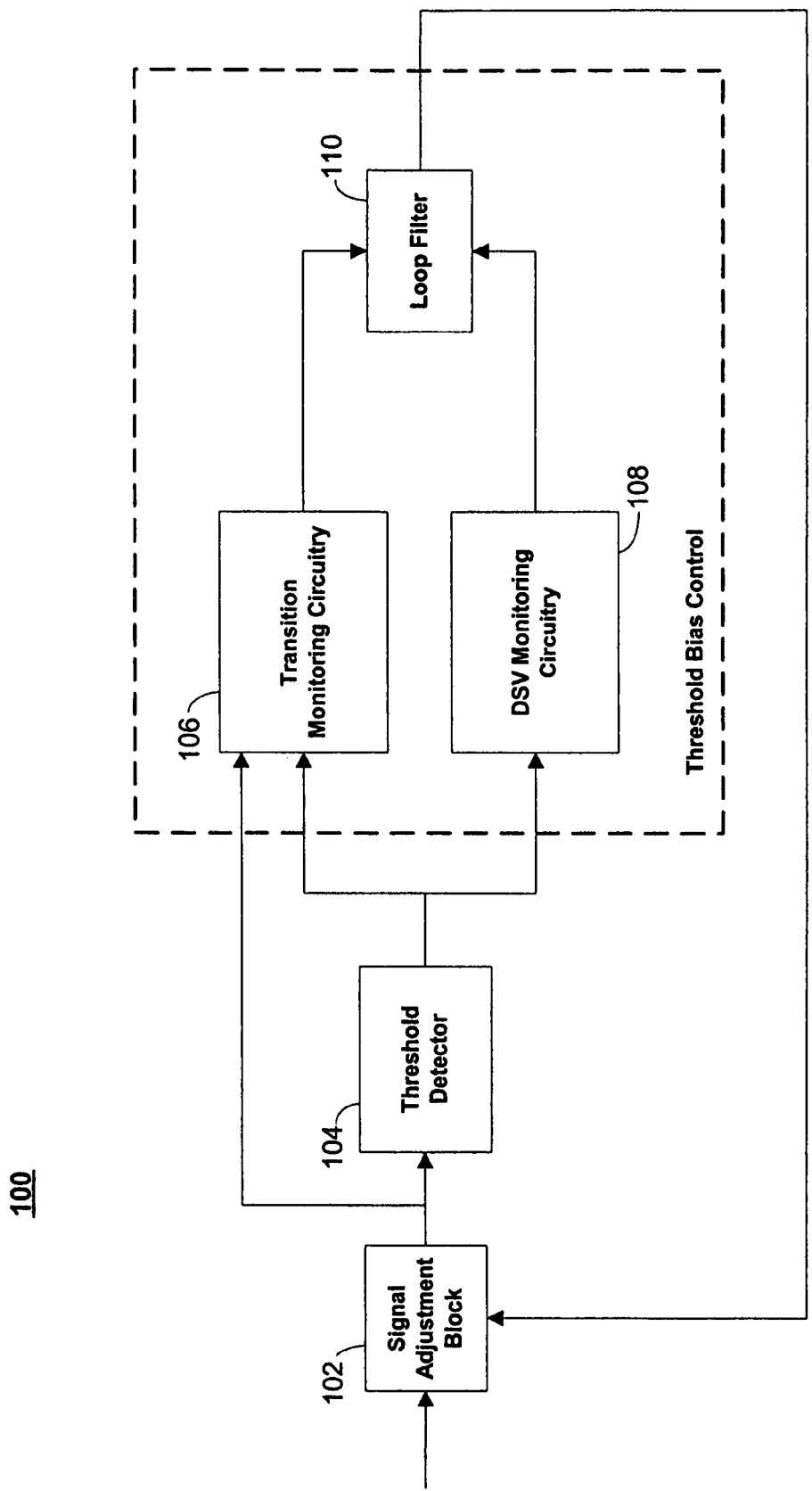
FIG. 1 is a simplified block diagram of an illustrative embodiment of the invention.

FIG. 1 depicts simplified block diagram 100 of an illustrative embodiment of the invention. Threshold detector 104, which may be any data detector, receives the detector's pick-up signal from signal adjustment block 102. The input of threshold detector 104 is connected to transition monitoring circuitry 106. The output of threshold detector 104 may be connected to both transition monitoring circuitry 106 and DSV monitoring circuitry 108. Transition monitoring circuitry 106 is adapted to sample the threshold detector's input at transition time (i.e., when the output of threshold detector 104 changes value) and output a DC error signal to loop filter 110.

DSV monitoring circuitry 108 may also receive the output of threshold detector 104. DSV monitoring circuitry is adapted to calculate the DSV of its input signal and monitor the DSV value. DSV monitoring circuitry may calculate the DSV of the detector's output continuously or DSV calculations may be synchronized with the threshold detector's clock or an external clock source (not shown).

DSV monitoring circuitry 108 may output a DC error signal to loop filter 110 only when the DSV exceeds a certain threshold value. This threshold value may be fixed or user-programmable. Loop filter 110 aggregates the DC error signals received from transition monitoring circuitry 106 and DSV monitoring circuitry 108. Loop filter 110 is adapted to output a signal correction term to signal adjustment block 102. This signal correction term is used by signal adjustment block 102 to augment or adjust the pick-up signal before entering threshold detector 104. For example, the signal correction term may drive the data detector's input to zero at transitions.

Although in the illustrated embodiments the detector's input signal is adjusted via signal adjustment block 102, an equivalent operation is to adjust the actual threshold of threshold detector 104. These two operations may be used interchangeably or a combination of both operations may be used to effect the desired threshold adjustment.

Figure 2:
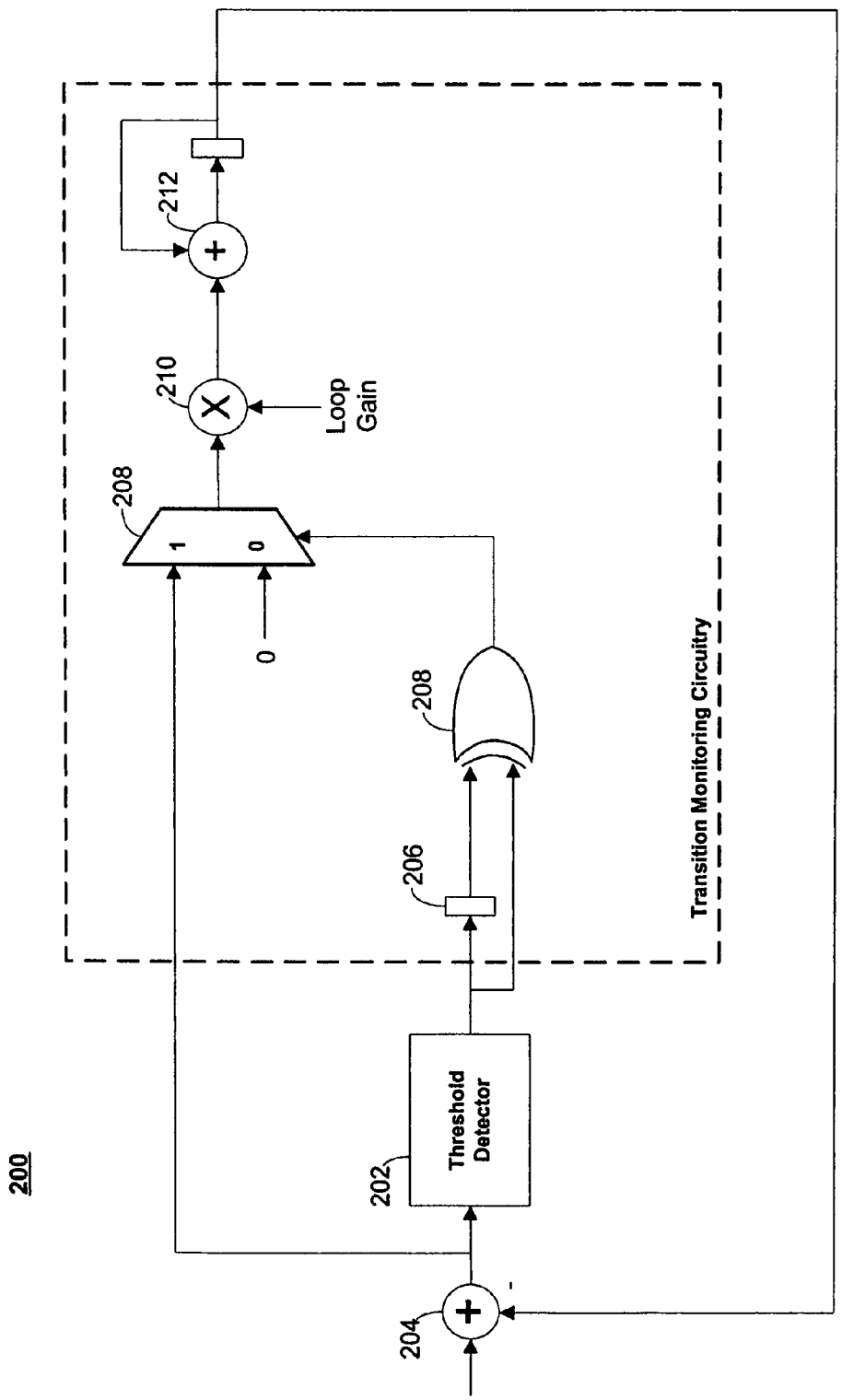
FIG. 2 is a simplified block diagram of an illustrative embodiment of a representative portion of the circuitry shown in FIG. 1 in accordance with the invention.

FIG. 2 shows a simplified block diagram of an illustrative embodiment of transition monitoring circuitry 200 in accordance with one embodiment of the invention. The output of threshold detector 202 may be connected to buffer 206 and XOR gate 208. Buffer 206 may be any memory or storage device (e.g., a flip-flop or bit register), and may store the previous bit output of threshold detector 202. XOR gate 208 receives the buffered output from buffer 206 and the current output of threshold detector 202.

If XOR gate 208 detects a change in the output signal of threshold detector 202, XOR gate 208 asserts its output. The output of XOR gate 208 may be used to select one of the two inputs of multiplexer 208. If no change is detected in the output signal of threshold detector 202, multiplexer 208 outputs a 0. If a change is detected in the output signal of threshold detector 202, multiplexer 208 may output the value of the input of threshold detector 202. This value corresponds to the value of the pick-up signal at transition time.

The output of multiplexer 208 may then be amplified by multiplier 210. Multiplier 210 may amplify the output of multiplier 210 by some loop gain. In at least some embodiments, the value of the loop gain is user-programmable and may depend on, for example, characteristics of the threshold detector, the pick-up signal, or the type of application. Finally, the signal output from multiplier 210 is accumulated by loop filter accumulator 212. The loop filter is adapted to output a DC correction term, which may be used to adjust the input of threshold detector 202. In the example of FIG. 2, accumulator 204 subtracts the transition correction term from the pick-up signal before the pick-up signal reaches the threshold detector. In this way, the threshold bias control of FIG. 2 may adjust the input of threshold detector 202 so that the input is zero at transitions.

Figure 3:
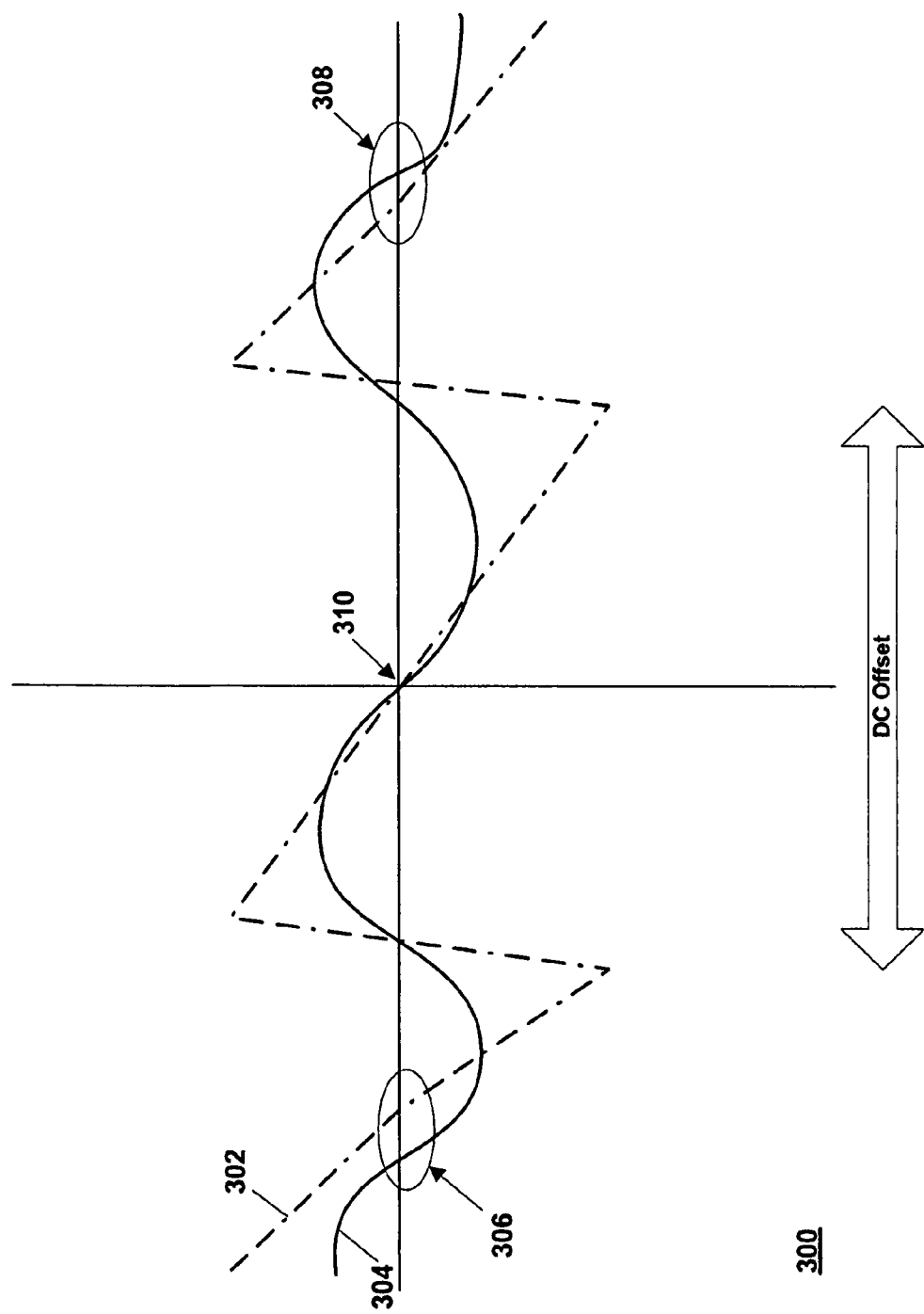
FIG. 3 is an illustrative graph showing representative false locking points in accordance with one embodiment of the invention.

In some instances, the loop filter of FIG. 2 may drive the transition value of threshold detector 202 to an incorrect value, as depicted in illustrative graph 300 of FIG. 3. Loop error gradient 302 represents an error gradient for an illustrative noise-free, asymmetry-free signal for various amounts of DC-offset. Error gradient 304 represents the error gradient for an illustrative asymmetry-free signal with a typical bit-error rate. When the error gradient is positive, the output of loop filter accumulator 212 (FIG. 2) will increase. Similarly, when the error gradient is negative, the output of the loop filter accumulator will decrease. Since the output of the loop filter is used to adjust the input of the threshold detector, the DC-offset of the detector pick-up signal will increase when the loop filter output increases, and the DC-offset of the detector pick-up signal will decrease when the loop filter output decreases. For low levels of DC-offset, this causes the loop error gradient to correctly converge to zero DC-offset at point 310.

However, as can be seen in illustrative graph 300, false locking points 306 and 308 exist in the error gradient. These false locking points may cause the loop filter to lock at an incorrect DC-offset, especially if the pick-up signal initially contains a large positive or negative DC-offset. Locking to an incorrect point may cause the threshold detector to make many decision errors and may drastically increase the overall data transfer error rate of the system.

Figure 4:
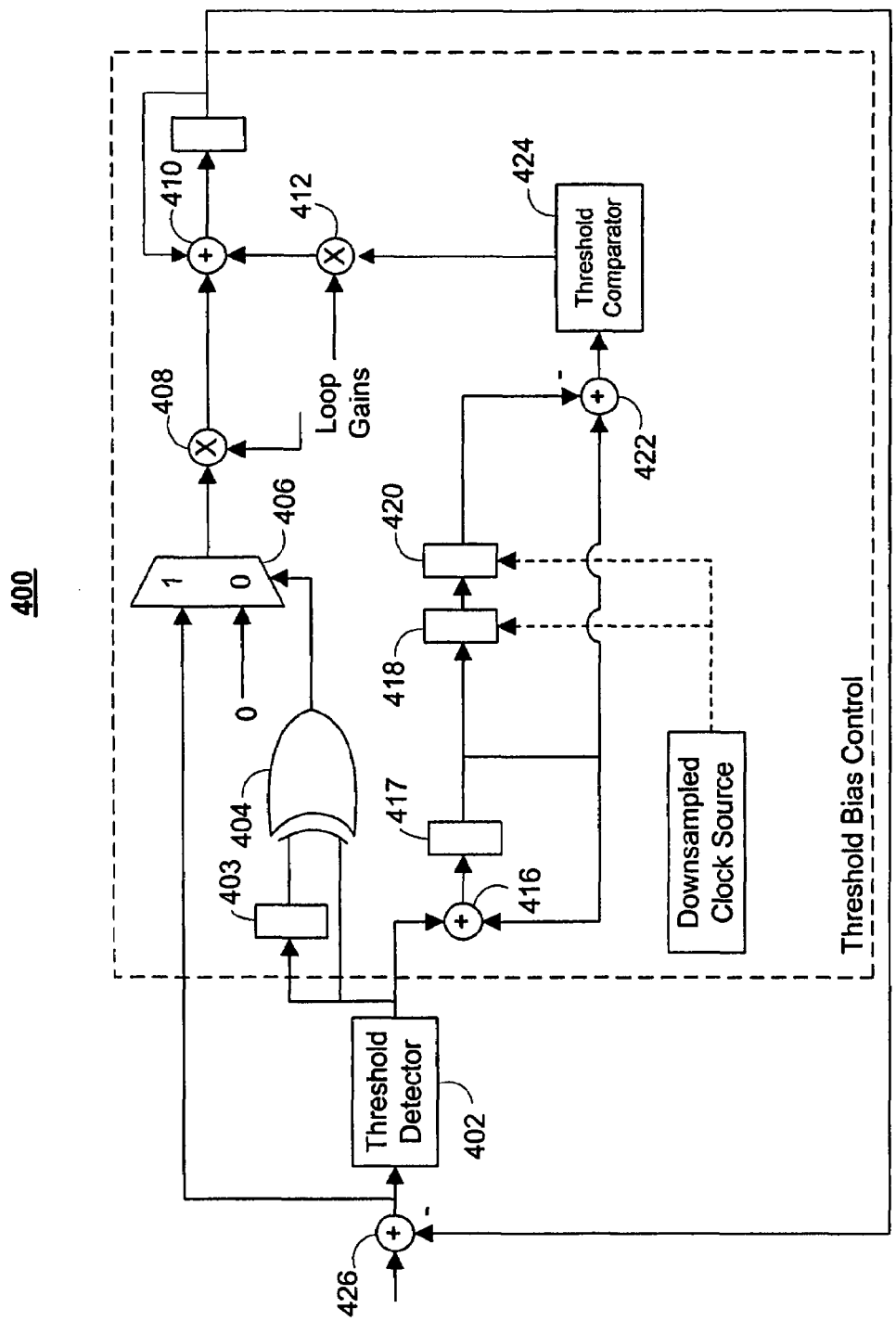
FIG. 4 is a more detailed, yet still simplified, block diagram of the circuitry shown in FIG. 1 in accordance with one embodiment of the invention.

FIG. 4 shows a more detailed, yet still simplified, block diagram of the circuitry shown in FIG. 1 in accordance with one embodiment of the invention. Since many communication systems (e.g., optical and magnetic data systems) impose DSV constraints on the channel data, improved circuitry 400 may monitor the transition value and the DSV of the detector's output. By monitoring the DSV of the detector's output, circuitry 400 can help reduce or eliminate the possibility that the loop will lock to an incorrect value. For example, typical optical systems try to minimize the DSV of a recorded sequence to reduce low-frequency energy in the readback signal, which can interfere with the operation of tracking and focusing servos. Circuitry 400 may monitor the DSV of the detector's output and output a DC error signal when the DSV exceeds some threshold value.

Still referring to FIG. 4, the output of threshold detector 402 may be connected to buffer 403, XOR gate 404, and accumulator 416. Similar to the operation of FIG. 2, if XOR gate 404 detects a change in the output signal of threshold detector 402, XOR gate 404 asserts its output. The output of XOR gate 404 may be used to select one of the two inputs of multiplexer 406. If no change is detected in the output signal of threshold detector 402, multiplexer 406 outputs a 0. If a change is detected in the output signal of threshold detector 402, multiplexer 406 may output the value of the input of threshold detector 402. This value corresponds to the value of the pick-up signal at transition time.

The output of multiplexer 404 may then be amplified by multiplier 408. Multiplier 408 may amplify the output of multiplier 406 by some loop gain. The value of the loop gain may be user-programmable. Loop filter accumulator 410 then accumulates the amplified transition error signal with the error signal from the bottom DSV monitoring loop. Reset circuitry (not shown) may also be used to reset the transition error signal to some user-defined value during the accumulation stage.

The DSV monitoring loop starts with accumulator 416. Accumulator 416 receives the output of threshold detector 402. In the illustrated embodiment, the output of threshold detector 402 is selected from the set $\{-1,1\}$ depending on the value of the input to the detector. However, as previously discussed, threshold detector 402 may output other values or be a multilevel data detector. The output of accumulator 416, which corresponds to the DSV of the output of threshold detector 402, is stored in buffer 417. Buffer 418 may sample the DSV value at a downsampled clock rate. Buffer 420 may then sample the output of buffer 418 at the same downsampled clock rate. Although in the illustrated embodiment, two downsampled buffers are depicted, any number of downsampled buffers may be used. Additionally or alternatively, the downsampled clock source for these buffers may be different, if desired. In some embodiments, the downsampled rate is user-programmable and is selected based on the DSV properties of the output of threshold detector 402. Downsampled buffer 420 stores another DSV snapshot separated from the value stored in buffer 417 by some small amount of time. This way, the effects of short-term fluctuations in the DSV and erroneous data can be minimized. The short-term change in the DSV of the output of threshold detector 402 is calculated by taking the difference between the current DSV value stored in buffer 417 and the previous DSV value stored in buffer 420. This DSV calculation is performed by accumulator 422 and passed to threshold comparator 424.

Threshold comparator 424 determines if the DSV received from accumulator 422 exceeds some threshold value. In some embodiments, this threshold value is user-programmable. The threshold value may remain constant or adapt to changing DSV levels. In some embodiments, the threshold value is selected based on the DSV properties of the output of threshold detector 402. When the absolute value of the DSV exceeds the selected threshold, threshold comparator 424 may output the sign of the DSV. In other embodiments, threshold comparator 424 outputs the actual DSV or the difference between the actual DSV and the threshold value.

The output of threshold comparator 424 may be amplified by multiplier 412. Similar to multiplier 408, multiplier 412 may amplify the output of threshold comparator 424 by any loop gain. The value of the loop gain may be user-programmable. This signal is incorporated as feedback into the loop filter via accumulator 410.

Figure 5:
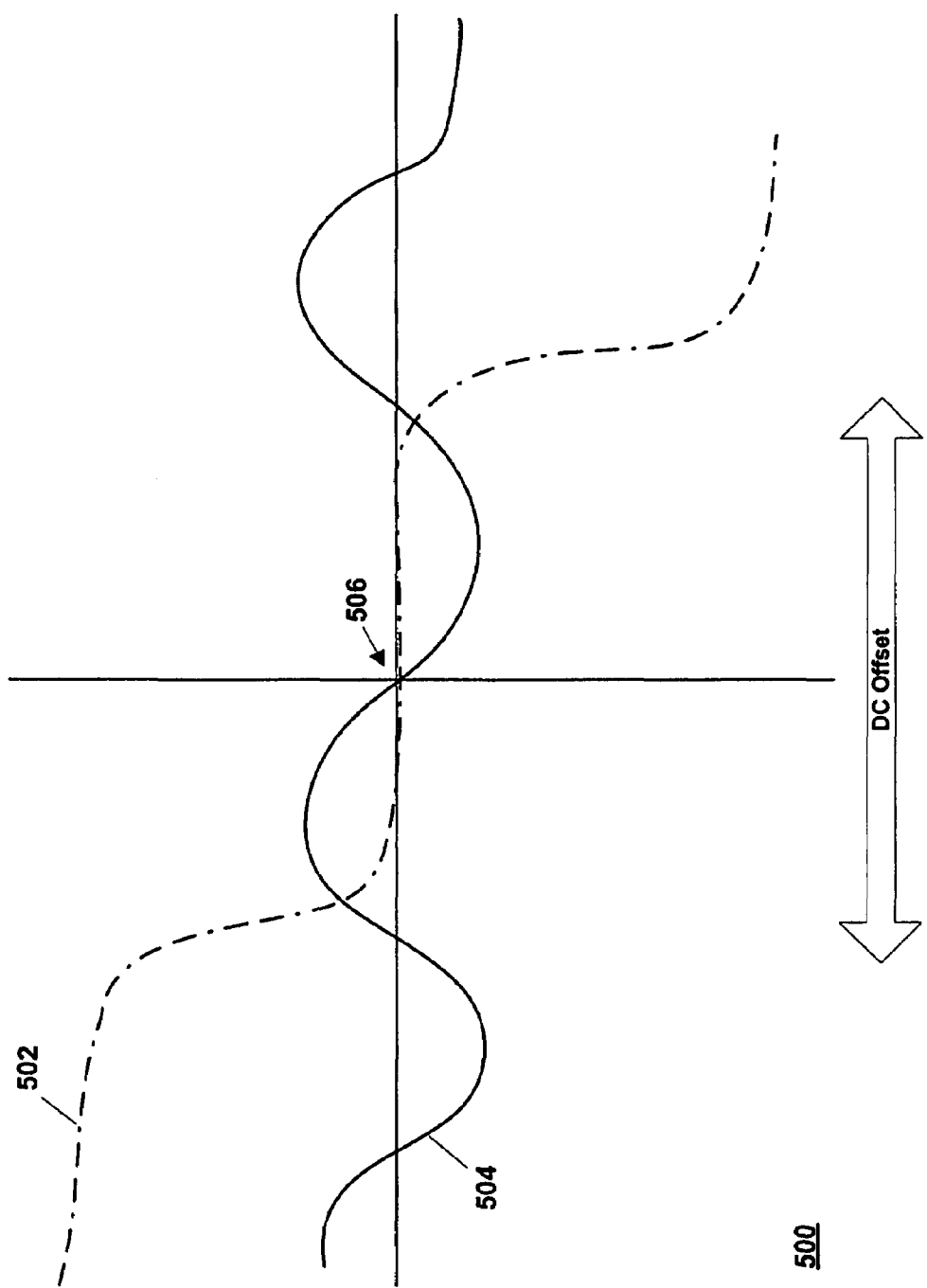
FIG. 5 is an illustrative graph showing a representative DSV gradient in accordance with one embodiment of the invention.

Illustrative graph 500 shows how monitoring the DSV can help avoid false locking points. DSV gradient 502 stays close to zero when the absolute value of the DC-offset is close to zero. As the absolute value of the DC-offset increases, the absolute value of the DSV gradient increases sharply. By incorporating the DSV gradient into the loop filter, loop error gradient 504 is forced to correct locking point 506 regardless of the DC-offset. In the example of FIG. 5, false locking points are completely eliminated.

Figure 6:
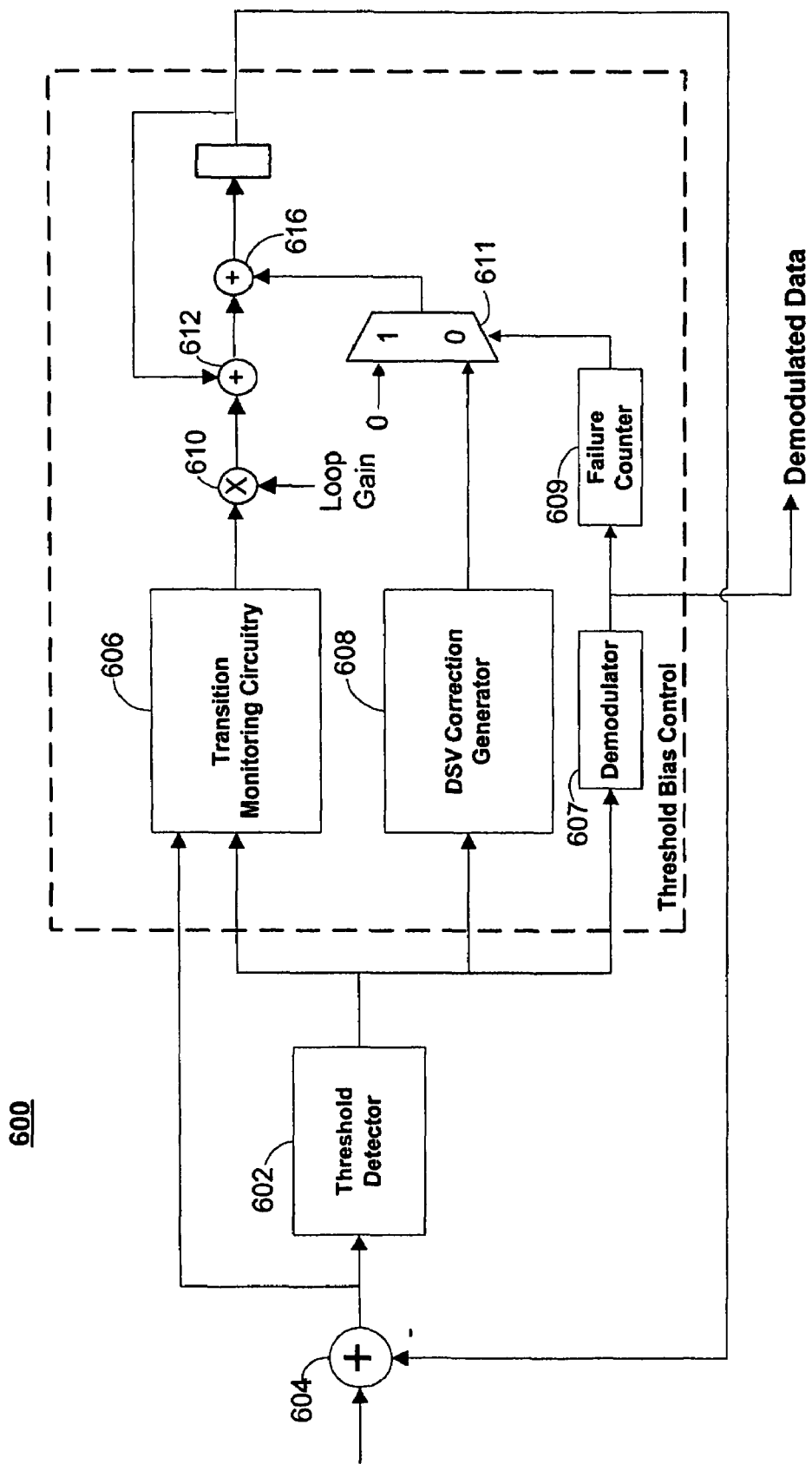
FIG. 6 is a simplified block diagram of an illustrative, self-correcting embodiment of the invention.

In addition to incorporating the DSV gradient directly into the loop filter, the DSV gradient could also be used as a monitoring device in a bias loop with self-correction, as shown in illustrative circuitry 600 of FIG. 6. When the DSV of threshold detector 602 exceeds some user-defined threshold value (or when the DSV exceeds some user-defined threshold value for a certain amount of time), DSV correction generator 608 could generate a DSV correction term. This DSV correction term could be incorporated into the output of transition monitoring circuitry 606 after the transition-based error signal was amplified by some loop gain via multiplier 610. Since the exceeded DSV threshold may indicate that the loop has locked to a false locking point, DSV correction generator 608 can determine the approximate adjustment needed to correct the loop filter output. In the example of FIG. 6, this DSV correction value can be incorporated into the feedback loop after loop filter accumulator 612 via accumulator 616. The output of the loop filter may be subtracted from the signal input to threshold detector 602 using accumulator 604.

In some embodiments, demodulation failures may be used as a condition for applying the DSV correction signal. For example, demodulator 607 may be unable to decode the output of threshold detector 602 in certain situations. For example, when errors exist in the detector output, demodulator 607 may fail to demodulate or decode the output of threshold detector 602. By monitoring the number of demodulation failures, the DSV correction term may be selectively applied to the feedback loop via accumulator 616, if desired. If demodulator 607 has a low failure rate, then it is likely that the threshold bias is at an acceptable level even if DSV correction generator 608 or threshold comparator 424 of FIG. 4 indicates that the threshold bias should be adjusted. Demodulator 607 may send a failure signal to failure counter 609. When failure counter 609 determines that the demodulation failure rate is above some threshold level (which may be user-programmable), failure counter 609 may signal multiplexer 611 to apply the DSV correction term generated by DSV correction generator 608.

Figure 7:
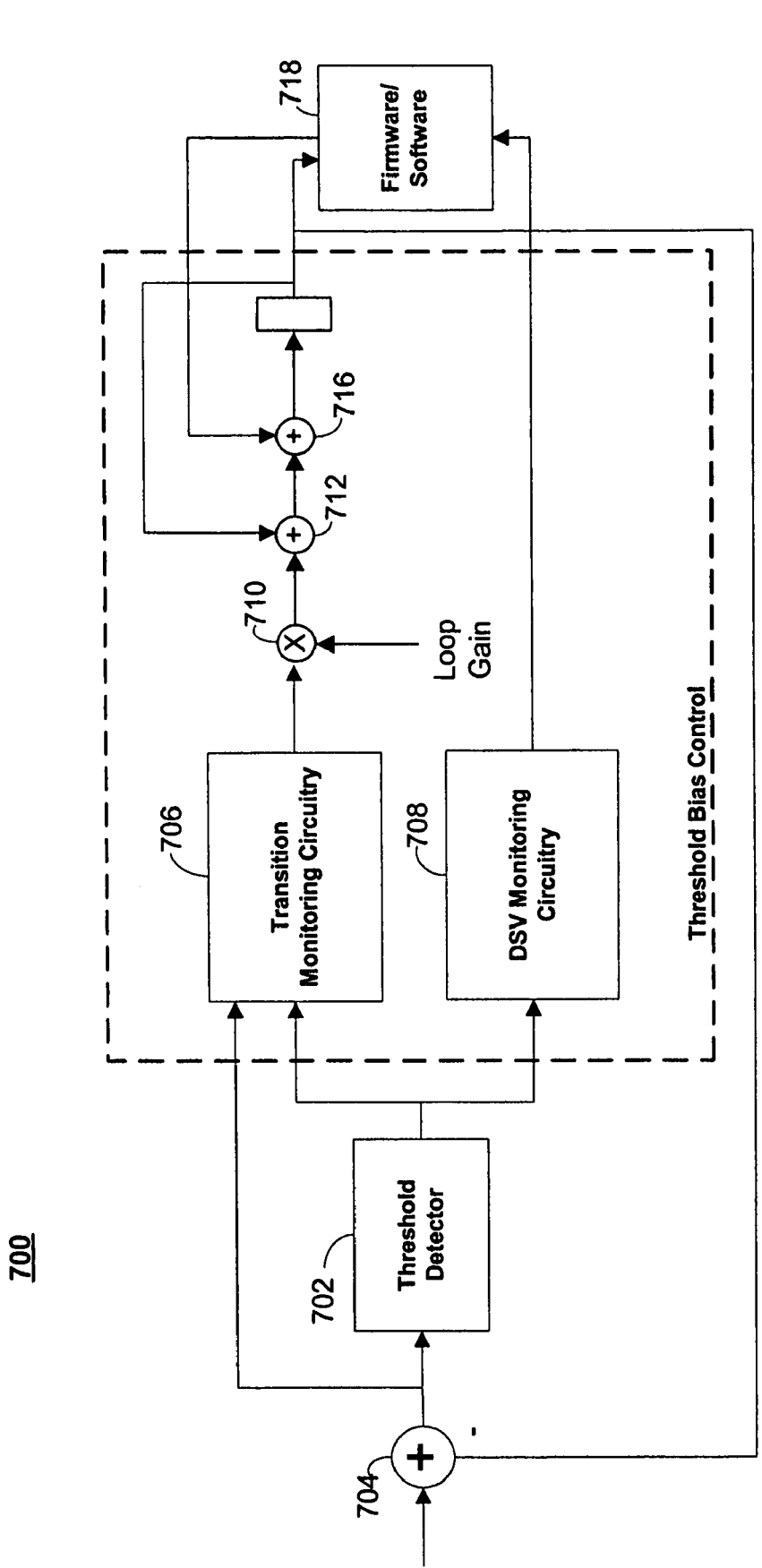
FIG. 7 is a simplified block diagram of an illustrative, firmware-controlled embodiment of the invention.

For increased flexibility and user-programmability, the DSV correction term could also be generated by firmware or software, as shown in illustrative circuitry 700 of FIG. 7. This embodiment is similar to illustrative circuitry 600, but firmware/software 718 may generate the DSV correction term. The output of threshold detector 702 is received by transition monitoring circuitry 706 and DSV monitoring circuitry 708. As previously described, transition monitoring circuitry 706 may output the transition values of the threshold detector's input. These transition values may be amplified by some loop gain using multiplier 710. Loop filter accumulator 712 may accumulate the transition values before a DSV correction term is fed into the threshold bias control loop at accumulator 716. The DSV correction term may be generated by firmware/software 718. The output of DSV monitoring circuitry 708, which may include the DSV of the output of threshold detector 702 or some indicator of the DSV value, is connected to firmware/software 718. Firmware/software 718 may also receive the current loop filter output. Using these two values and a model of the channel, firmware/software 718 may calculate a DSV correction term and feed this term into the accumulator 716. The loop filter output may then be subtracted from the input of threshold detector 702 by accumulator 704.

Figure 8:
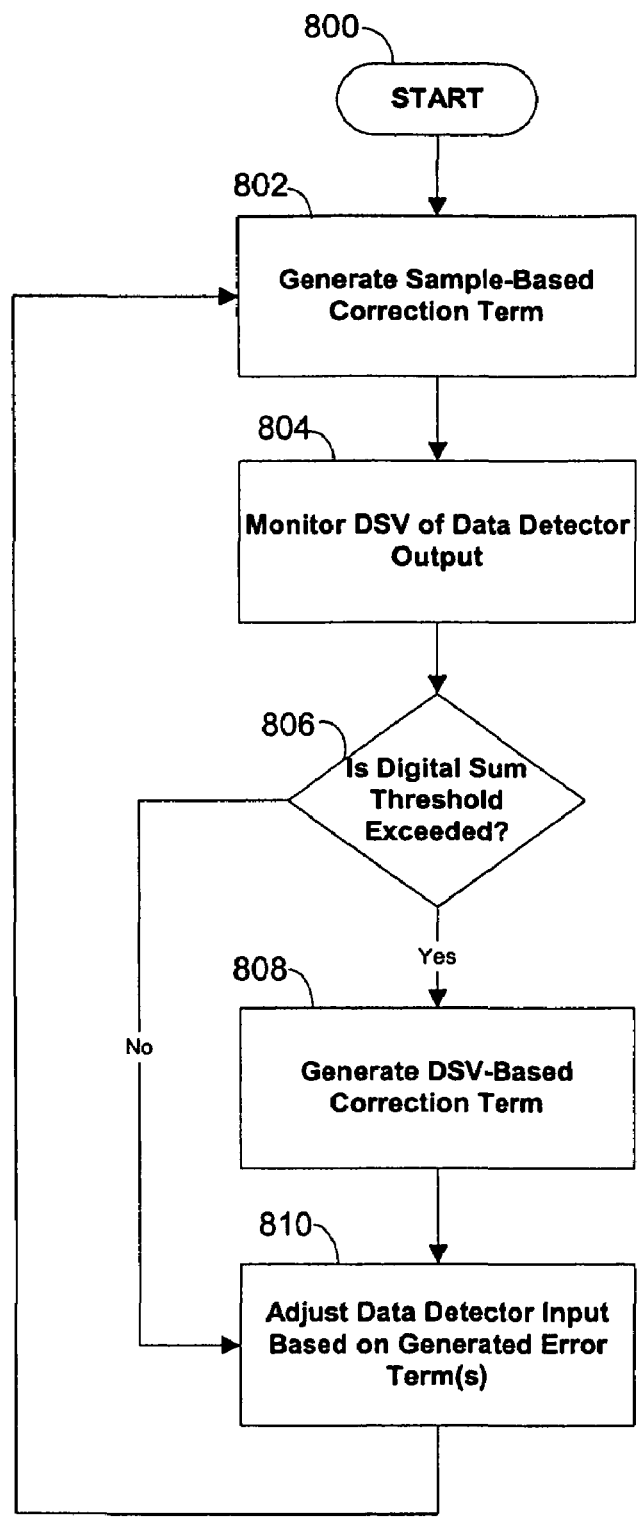
FIG. 8 is a flow chart depicting an illustrative method for adjusting the input to a threshold detector in accordance with one embodiment of the invention.

FIG. 8 shows an illustrative method for adjusting the input to a threshold detector in accordance with one embodiment of the invention. Although the example of FIG. 8 is directed to adjusting the input of the threshold detector, an equivalent operation is to adjust the actual threshold value the detector used to make data detection decisions. The illustrative method starts at step 800, which may correspond to the start of data being fed into a data detector, such as a data slicer or threshold detector. At step 802, a sample-based correction term is generated using some characteristic of the detected sample. Typically, the transition value of the data detector is accumulated to generate this correction term, but other sample-based correction terms could be based on, for example, the average of the positive and negative peaks of the sample and/or the jitter of the signal near transitions. At step 804, the DSV of the data detector's output is monitored. The slicer bias control then determines if the DSV exceeds some threshold value at decision 806. This value may be user-programmable. If the threshold value is exceeded, a DSV-based correction term is generated at step 808. This DSV-based correction term may be generated in hardware or a combination of hardware, software, and/or firmware. At step 810, the data detector's input is adjusted based on the generated correction term(s). The illustrative method may continue at step 802 by generating another sample-based correction term for the next sample.

Referring now to FIGS. 9A-9F, various exemplary implementations of the present invention are shown.

Figure 9A:
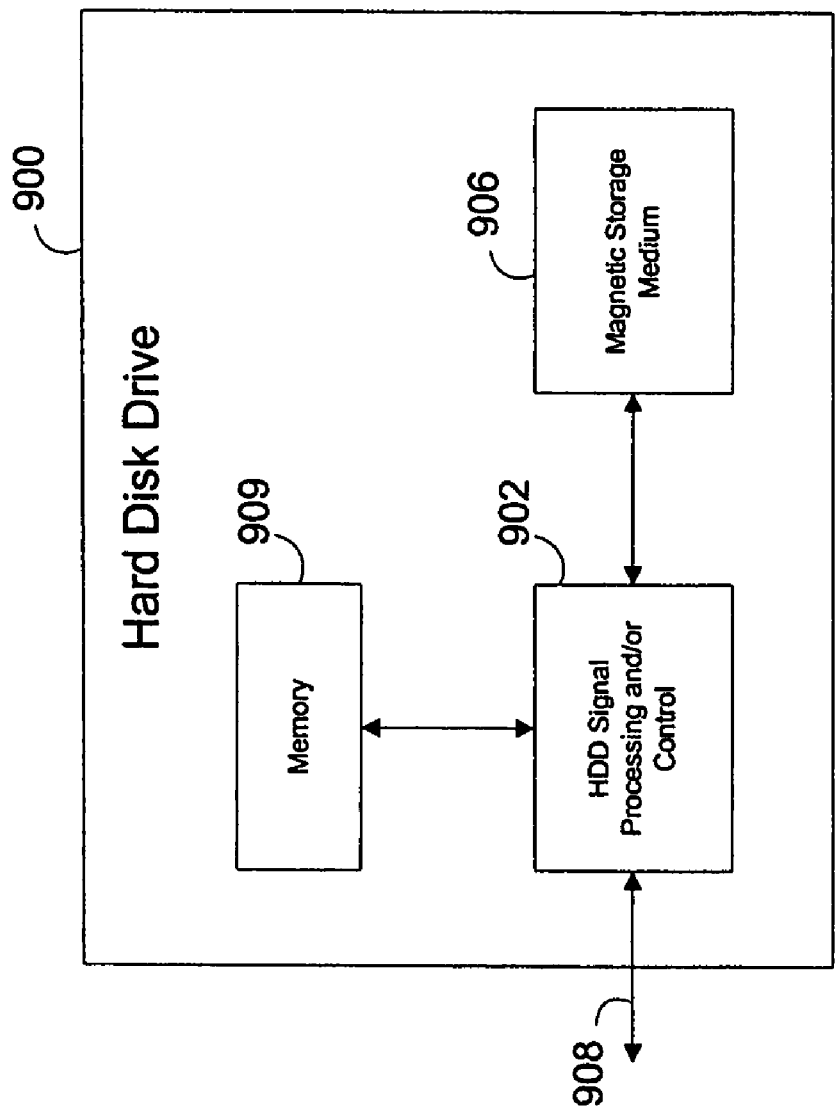
FIG. 9A is a block diagram of an exemplary hard disk drive that can employ the disclosed technology.

Referring now to FIG. 9A, the present invention can be implemented in a hard disk drive 900. The present invention may implement either or both signal processing and/or control circuits, which are generally identified in FIG. 9A at 902. In some implementations, the signal processing and/or control circuit 902 and/or other circuits (not shown) in the HDD 900 may process data, perform coding and/or encryption, perform calculations, and/or format data that is output to and/or received from a magnetic storage medium 906.

The HDD 900 may communicate with a host device (not shown) such as a computer, mobile computing devices such as personal digital assistants, cellular phones, media or MP3 players and the like, and/or other devices via one or more wired or wireless communication links 908. The HDD 900 may be connected to memory 909 such as random access memory (RAM), low latency nonvolatile memory such as flash memory, read only memory (ROM) and/or other suitable electronic data storage.

Figure 9B:
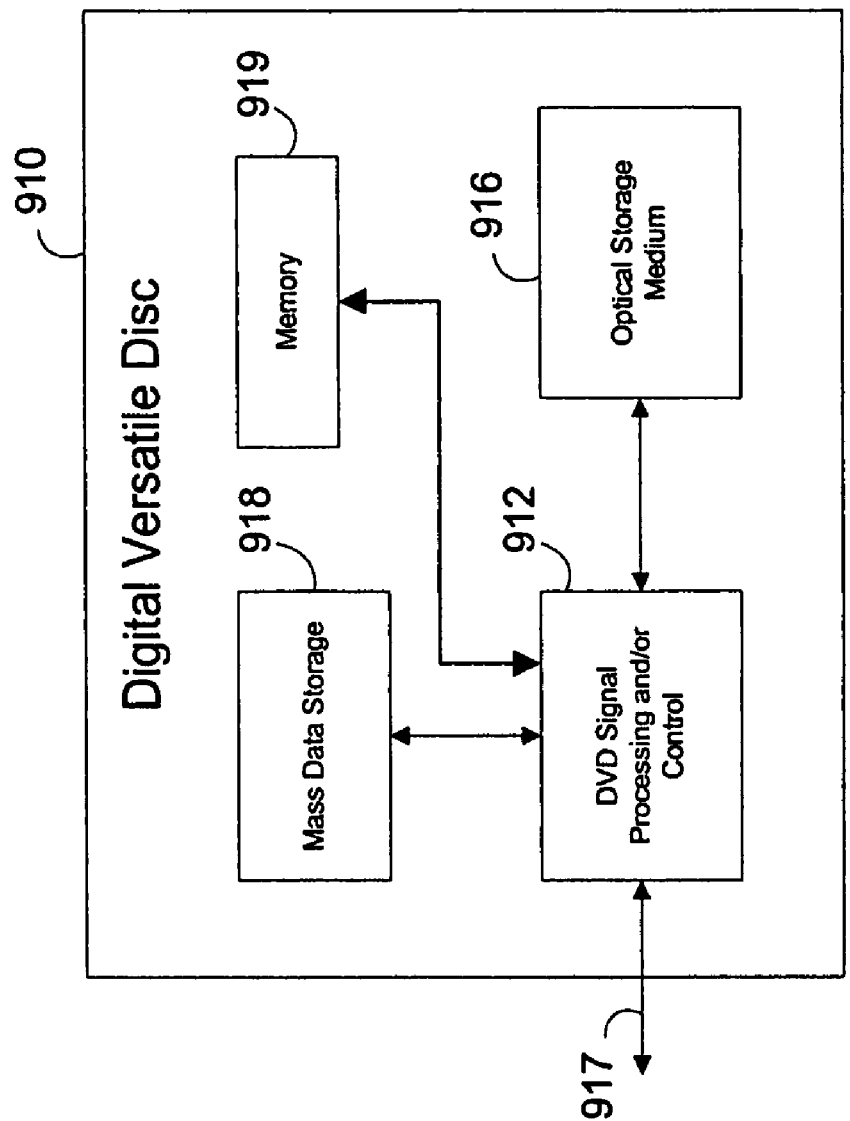
FIG. 9B is a block diagram of an exemplary digital versatile disc drive that can employ the disclosed technology.

Referring now to FIG. 9B, the present invention can be implemented in a digital versatile disc (DVD) drive 910. The present invention may implement either or both signal processing and/or control circuits, which are generally identified in FIG. 9B at 912, and/or mass data storage of the DVD drive 910. The signal processing and/or control circuit 912 and/or other circuits (not shown) in the DVD 910 may process data, perform coding and/or encryption, perform calculations, and/or format data that is read from and/or data written to an optical storage medium 916. In some implementations, the signal processing and/or control circuit 912 and/or other circuits (not shown) in the DVD 910 can also perform other functions such as encoding and/or decoding and/or any other signal processing functions associated with a DVD drive.

The DVD drive 910 may communicate with an output device (not shown) such as a computer, television or other device via one or more wired or wireless communication links 917. The DVD 910 may communicate with mass data storage 918 that stores data in a nonvolatile manner. The mass data storage 918 may include a hard disk drive (HDD). The HDD may have the configuration shown in FIG. 9A. The HDD may be a mini HDD that includes one or more platters having a diameter that is smaller than approximately 1.8". The DVD 910 may be connected to memory 919 such as RAM, ROM, low latency nonvolatile memory such as flash memory and/or other suitable electronic data storage.

Figure 9C:
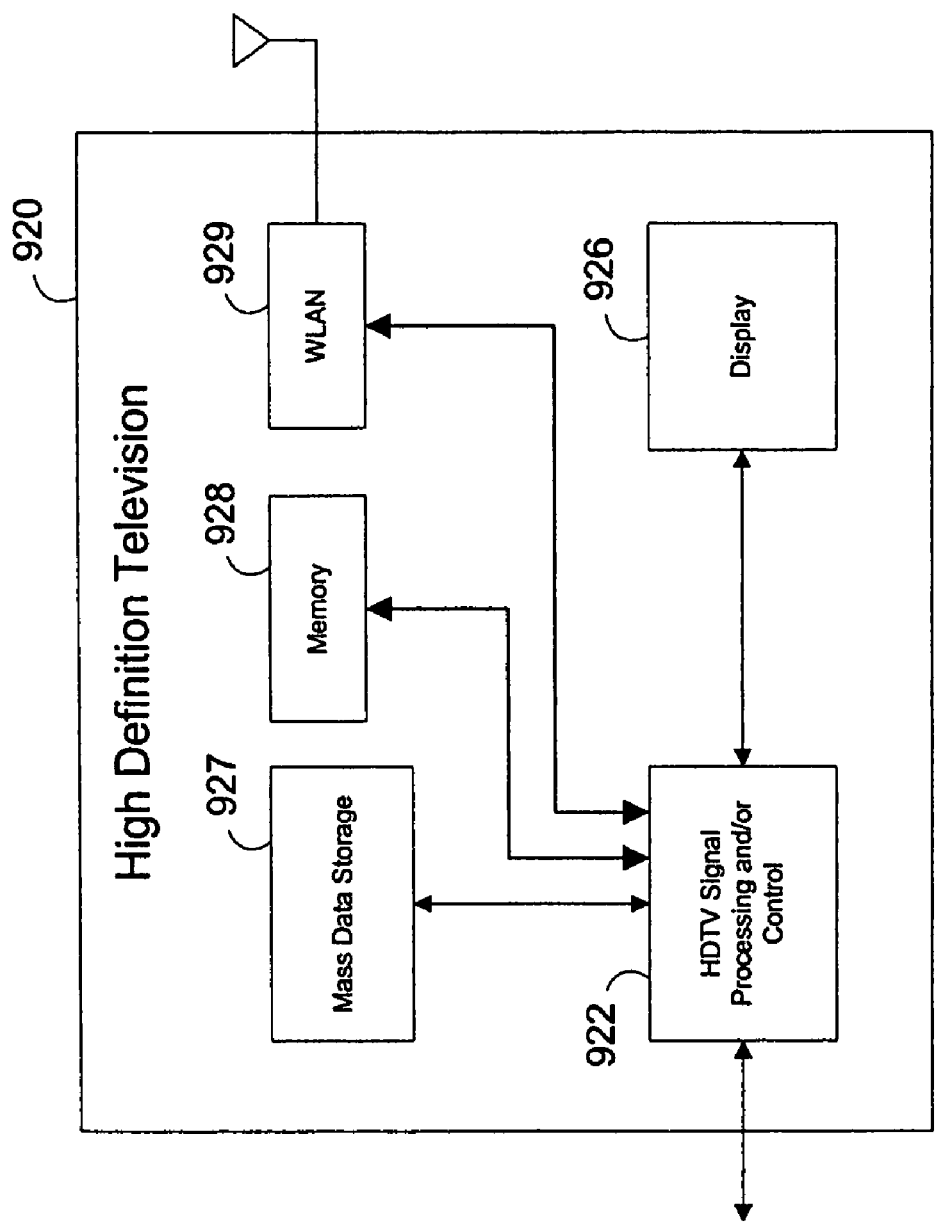
FIG. 9C is a block diagram of an exemplary high definition television that can employ the disclosed technology.

Referring now to FIG. 9C, the present invention can be implemented in a high definition television (HDTV) 920. The present invention may implement either or both signal processing and/or control circuits, which are generally identified in FIG. 9C at 922, a WLAN interface and/or mass data storage of the HDTV 920. The HDTV 920 receives HDTV input signals in either a wired or wireless format and generates HDTV output signals for a display 926. In some implementations, signal processing circuit and/or control circuit 922 and/or other circuits (not shown) of the HDTV 920 may process data, perform coding and/or encryption, perform calculations, format data and/or perform any other type of HDTV processing that may be required.

The HDTV 920 may communicate with mass data storage 927 that stores data in a nonvolatile manner such as optical and/or magnetic storage devices. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 920 may be connected to memory 928 such as RAM, ROM, low latency nonvolatile memory such as flash memory and/or other suitable electronic data storage. The HDTV 920 also may support connections with a WLAN via a WLAN network interface 929.

Figure 9D:
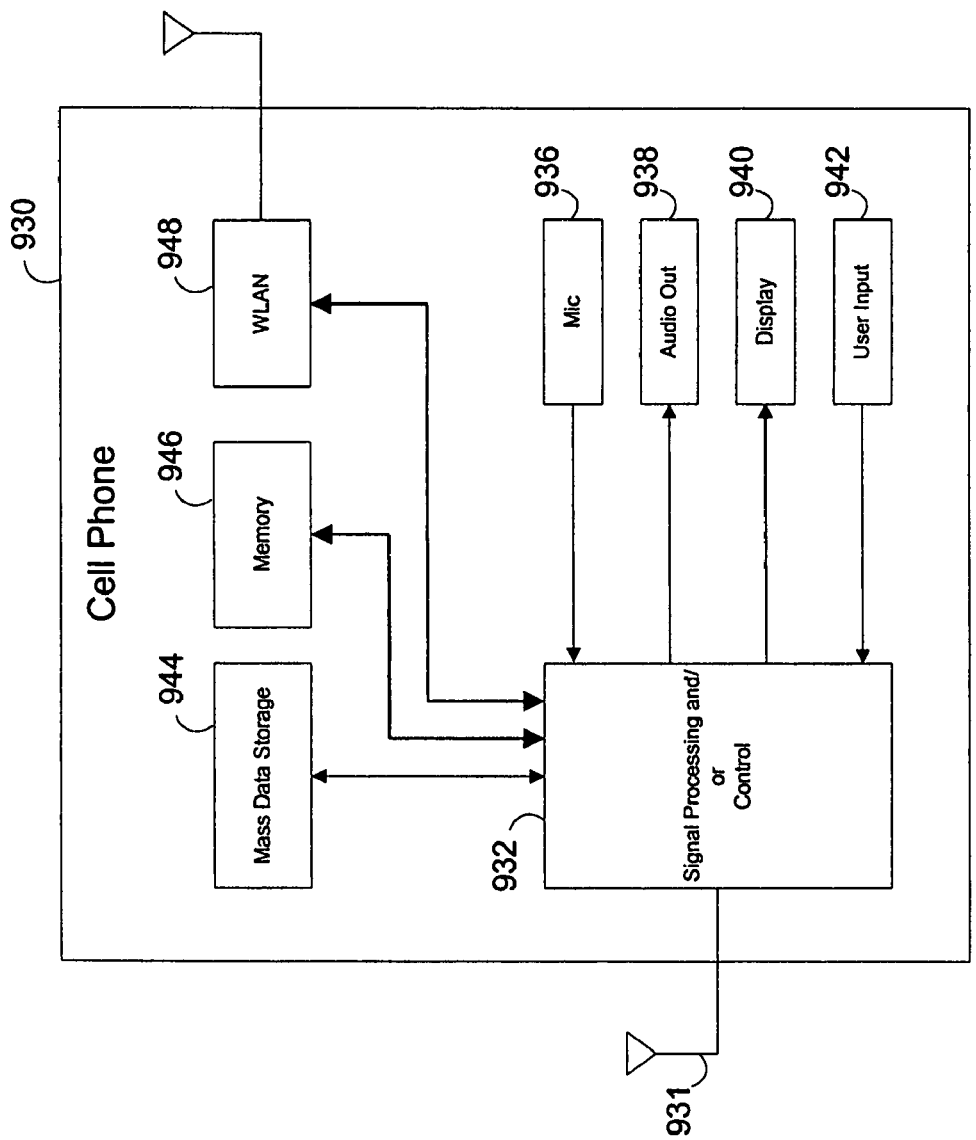
FIG. 9D is a block diagram of an exemplary cell phone that can employ the disclosed technology.

Referring now to FIG. 9D, the present invention can be implemented in a cellular phone 930 that may include a cellular antenna 931. The present invention may implement either or both signal processing and/or control circuits, which are generally identified in FIG. 9D at 932, a WLAN interface and/or mass data storage of the cellular phone 930. In some implementations, the cellular phone 930 includes a microphone 936, an audio output 938 such as a speaker and/or audio output jack, a display 940 and/or an input device 942 such as a keypad, pointing device, voice actuation and/or other input device. The signal processing and/or control circuits 932 and/or other circuits (not shown) in the cellular phone 930 may process data, perform coding and/or encryption, perform calculations, format data and/or perform other cellular phone functions.

The cellular phone 930 may communicate with mass data storage 944 that stores data in a nonvolatile manner such as optical and/or magnetic storage devices for example hard disk drives HDD and/or DVDS. At least one HDD may have the configuration shown in FIG. 9A and/or at least one DVD may have the configuration shown in FIG. 9B. The HDD may be a mini HDD that includes one or more platters having a diameter that is smaller than approximately 1.8". The cellular phone 930 may be connected to memory 946 such as RAM, ROM, low latency nonvolatile memory such as flash memory and/or other suitable electronic data storage. The cellular phone 930 also may support connections with a WLAN via a WLAN network interface 948.

Figure 9E:
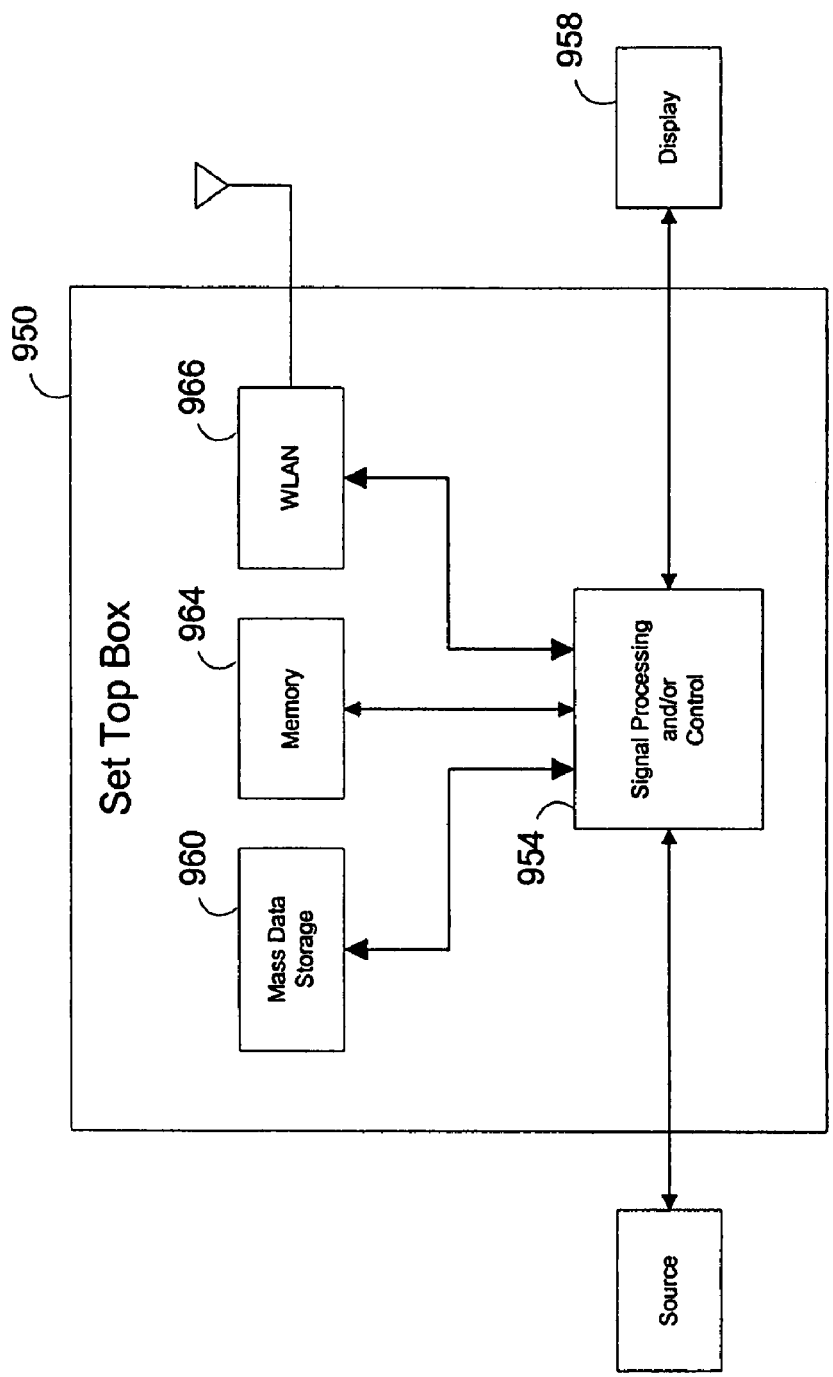
FIG. 9E is a block diagram of an exemplary set top box that can employ the disclosed technology.

Referring now to FIG. 9E, the present invention can be implemented in a set top box 950. The present invention may implement either or both signal processing and/or control circuits, which are generally identified in FIG. 9E at 954, a WLAN interface and/or mass data storage of the set top box 950. The set top box 950 receives signals from a source such as a broadband source and outputs standard and/or high definition audio/video signals suitable for a display 958 such as a television and/or monitor and/or other video and/or audio output devices. The signal processing and/or control circuits 954 and/or other circuits (not shown) of the set top box 950 may process data, perform coding and/or encryption, perform calculations, format data and/or perform any other set top box function.

The set top box 950 may communicate with mass data storage 960 that stores data in a nonvolatile manner. The mass data storage 960 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The set top box 950 may be connected to memory 964 such as RAM, ROM, low latency nonvolatile memory such as flash memory and/or other suitable electronic data storage. The set top box 950 also may support connections with a WLAN via a WLAN network interface 966.

Figure 9F:
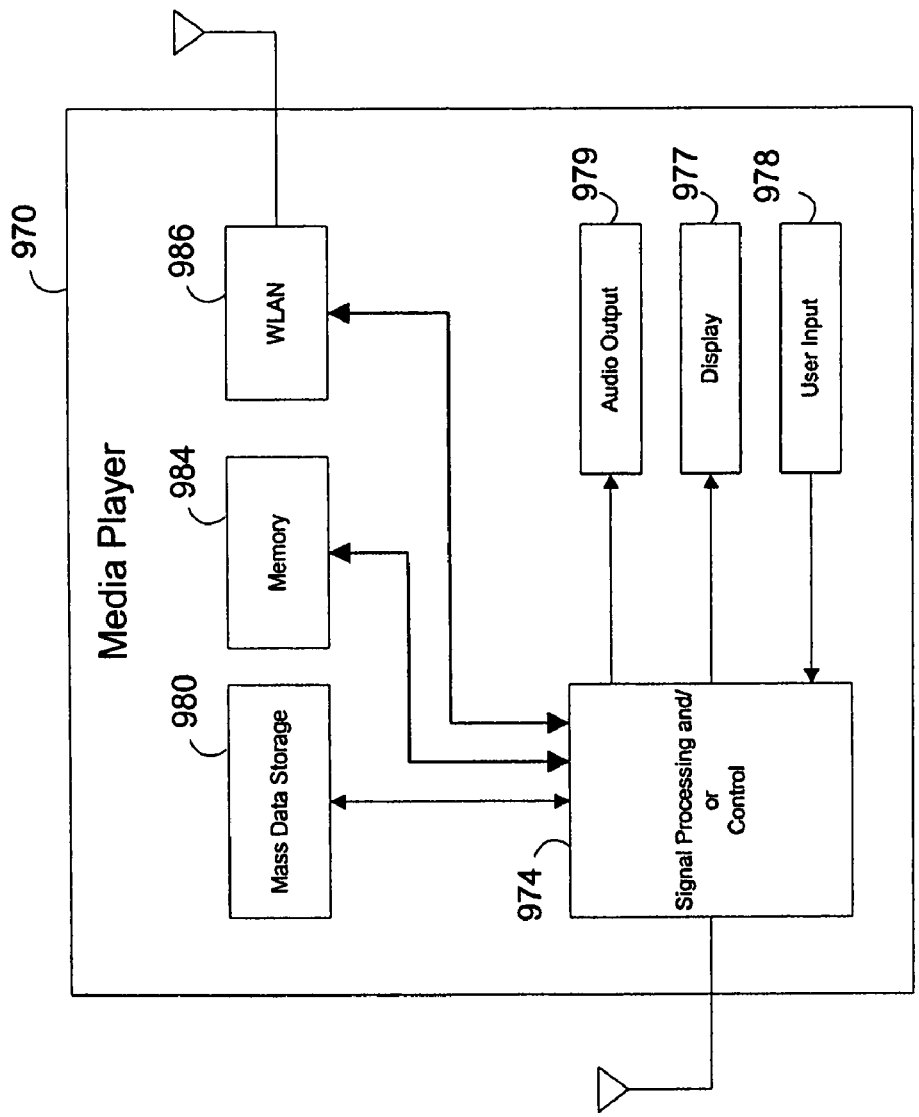
FIG. 9F is a block diagram of an exemplary media player that can employ the disclosed technology.

Referring now to FIG. 9F, the present invention can be implemented in a media player 970. The present invention may implement either or both signal processing and/or control circuits, which are generally identified in FIG. 9F at 974, a WLAN interface and/or mass data storage of the media player 970. In some implementations, the media player 970 includes a display 977 and/or a user input 1108 such as a keypad, touchpad and the like. In some implementations, the media player 970 may employ a graphical user interface (GUI) that typically employs menus, drop down menus, icons and/or a point-and-click interface via the display 977 and/or user input 978. The media player 970 further includes an audio output 979 such as a speaker and/or audio output jack. The signal processing and/or control circuits 974 and/or other circuits (not shown) of the media player 970 may process data, perform coding and/or encryption, perform calculations, format data and/or perform any other media player function.

The media player 970 may communicate with mass data storage 980 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The media player 970 may be connected to memory 974 such as RAM, ROM, low latency nonvolatile memory such as flash memory and/or other suitable electronic data storage. The media player 970 also may support connections with a WLAN via a WLAN network interface 986. Still other implementations in addition to those described above are contemplated.

It will be understood that the foregoing is only illustrative of the principles of the invention, and that various modifications can be made by those skilled in the art without departing from the scope and spirit of the invention. For example, the code constraints described herein are merely illustrative. Other constraints may be applied that may be equally or better suited to particular applications and the following claimed invention.

What is claimed is:

1. A bias loop for adjusting a data detector, the bias loop comprising:
   transition monitoring circuitry configured to sample a data detector's input signal at transition time;
   digital sum value monitoring circuitry configured to calculate a digital sum value of the data detector's output; and
   loop filter circuitry connected to the outputs of the transition monitoring circuitry and digital sum value monitoring circuitry configured to generate a data detector adjustment signal.

2. The bias loop of claim 1 wherein the transition monitoring circuitry is connected to the data detector's input and output.

3. The bias loop of claim 1 wherein the digital sum value monitoring circuitry is further configured to calculate at least two digital sum values of the data detector's output, wherein the at least two digital sum values are separated by some time.

4. The bias loop of claim 1 wherein the digital sum value monitoring circuitry is further configured to compare the calculated digital sum value with a threshold value.

5. The bias loop of claim 4 wherein the threshold value is user-programmable.

6. The bias loop of claim 1 wherein the transition monitoring circuitry and the digital sum value monitoring circuitry are further configured to output correction signals to the loop filter circuitry.

7. The bias loop of claim 1 wherein the data detector adjustment signal is configured to adjust the input of the data detector.

8. The bias loop of claim 1 wherein the data detector adjustment signal is configured to adjust a threshold of the data detector.

9. The bias loop of claim 1 wherein the digital sum value monitoring circuitry is controlled by firmware or software.

10. The bias loop of claim 1 wherein the loop filter is further configured to drive the data detector's input to zero at transitions.

11. The bias loop of claim 1 further comprising:
demodulator circuitry configured to demodulate the data detector's output; and
counter circuitry configured to receive a demodulation failure signal from the demodulator circuitry.

12. The bias loop of claim 11 wherein the counter circuitry is further configured to determine the demodulator failure rate and compare the demodulator failure rate to a failure threshold value.

13. The bias loop of claim 12 wherein the failure threshold value is user-programmable.

14. The bias loop of claim 11 wherein the counter circuitry is configured to selectively apply the output of the digital sum value monitoring circuitry to the loop filter circuitry to generate the data detector adjustment signal.

15. The bias loop of claim 1 wherein the loop filter circuitry comprises a non-linear controller.

16. The bias loop of claim 15 wherein the non-linear controller is configured to generate the data detector adjustment signal.

17. The bias loop of claim 15 wherein the non-linear controller is selected from the group consisting of a PID controller, a neural net controller, and a lead/lag controller.

18. A DVD system comprising the bias loop of claim 1.

19. The DVD system of claim 18 wherein the bias loop is used to adjust an input signal of a threshold detector associated with the DVD system.

20. The DVD system of claim 18 wherein the bias loop is used to drive the input signal of a threshold detector associated with the DVD system to zero at transitions.

21. The DVD system of claim 18 further comprising signal processing circuitry.

22. The DVD system of claim 21 wherein the signal processing circuitry is configured to perform coding on data that is read from an optical storage medium.

23. The DVD system of claim 21 wherein the signal processing circuitry is configured to perform coding on data that is written to an optical storage medium.

24. A method for adjusting a data detector, the method comprising:
sampling a data detector's input signal at transition time;
calculating a digital sum value of the data detector's output; and
generating a data detector adjustment signal based on the sampled input and calculated digital sum value.

25. The method of claim 24 further comprising calculating at least two digital sum values of the data detector's output, wherein the at least two digital sum values are separated by some time.

26. The method of claim 24 further comprising comparing the calculated digital sum value with a threshold value.

27. The method of claim 26 wherein the threshold value is user-programmable.

28. The method of claim 24 further comprising outputting correction signals to loop filter circuitry.

29. The method of claim 24 wherein the data detector adjustment signal is configured to adjust the input of the data detector.

30. The method of claim 24 wherein the data detector adjustment signal is configured to adjust a threshold of the data detector.

31. The method of claim 24 wherein calculating the digital sum value is performed in firmware or software.

32. The method of claim 24 further comprising driving the data detector's input to zero at transitions.

33. A bias loop for adjusting a data detector, the bias loop comprising:
transition monitoring means for sampling a data detector's input signal at transition time;
digital sum value monitoring means for calculating a digital sum value of the data detector's output; and
loop filter means for generating a data detector adjustment signal.

34. The bias loop of claim 33 wherein the transition monitoring means is connected to the data detector's input and output.

35. The bias loop of claim 33 wherein the digital sum value monitoring means is configured to calculate at least two digital sum values of the data detector's output, wherein the at least two digital sum values are separated by some time.

36. The bias loop of claim 33 wherein the digital sum value monitoring means is further configured to compare the calculated digital sum value with a threshold value.

37. The bias loop of claim 36 wherein the threshold value is user-programmable.

38. The bias loop of claim 33 wherein the transition monitoring means and the digital sum value monitoring means are configured to output correction signals to the loop filter means.

39. The bias loop of claim 33 wherein the data detector adjustment signal is configured to adjust an input of the data detector.

40. The bias loop of claim 33 wherein the data detector adjustment signal is configured to adjust a threshold of the data detector.

41. The bias loop of claim 33 wherein the digital sum value monitoring means is controlled by firmware or software.

42. The bias loop of claim 33 wherein the loop filter means is configured to drive the data detector's input to zero at transitions.

43. This bias loop of claim 33 further comprising:
demodulator means for demodulating the data detector's output; and
counter means for receiving a demodulation failure signal from the demodulator means.

44. The bias loop of claim 43 wherein the counter means comprises means for comparing the failure rate of the demodulator means to a failure threshold value.

45. The bias loop of claim 44 wherein the failure threshold value is user-programmable.

* * * * *